Aug. 18, 1964  J. W. SCHWANINGER  3,145,292
FORWARD-BACKWARD COUNTER
Filed April 18, 1961  2 Sheets-Sheet 1

INVENTOR.
JOSEPH W. SCHWANINGER
BY
ATTORNEY

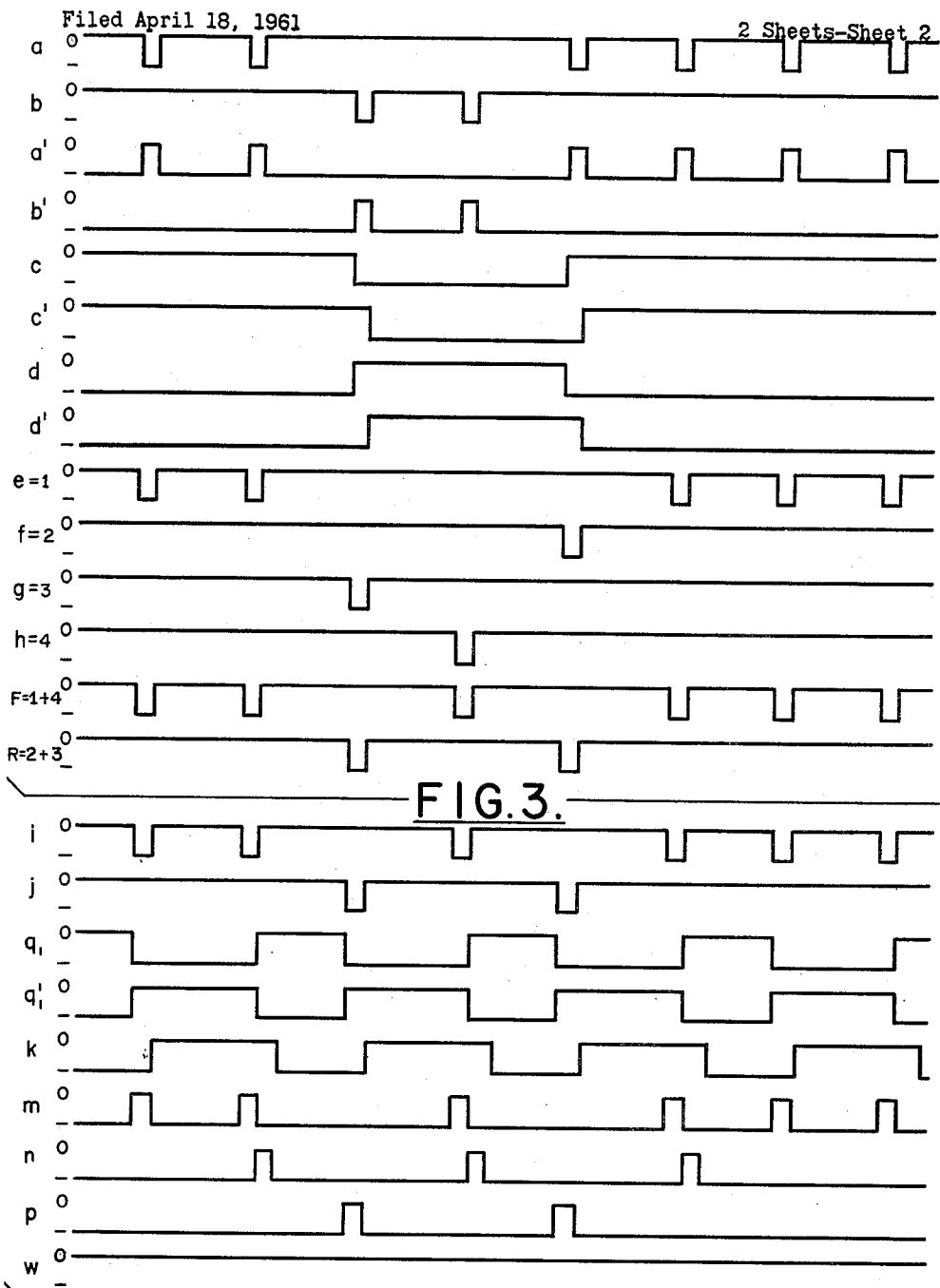

United States Patent Office 3,145,292
Patented Aug. 18, 1964

3,145,292
FORWARD-BACKWARD COUNTER
Joseph W. Schwaninger, Huntington Station, N.Y., assignor to Sperry Rand Corporation, Great Neck, N.Y., a corporation of Delaware
Filed Apr. 18, 1961, Ser. No. 103,864
4 Claims. (Cl. 235—92)

This invention relates to a forward-backward counter for use in computing apparatus, and more particularly relates to a counter adapted to receive two different series of pulsed type signals and to produce an output signal when the number of received pulses from either one of said series exceeds by a predetermined number N the number of pulses received from the other series, while at the same time indicating from which one of the series the greater number of pulses has been received.

One example of a possible use for the apparatus of this invention may be to monitor or to control a process or operation in which two series of input pulses representing respective incremental change of opposite, or different effect or sense cause a reference condition, quantity, state or position to change by a fixed limit which is represented by a count of N in the counter.

It is an object of this invention to provide a circuit adapted to receive two different series of pulsed type signals, and to provide an indication when the number of received pulses from one series exceeds by a fixed number the number of pulses received from the other series.

It is another object of this invention to provide a forward-backward counter for receiving two different series of pulsed signals and for providing an output pulse whenever the counter is in a certain condition indicating that the total number of received pulses from one of said series exceeds by a given number the total number received from the other series.

It is another object of this invention to provide a reversible counter for receiving two different series of input pulses and for counting in one direction upon the receipt of pulses from one of said series and, in effect, for reversing the direction of counting upon the receipt of pulses from the other one of said series, and for providing an output signal whenever the counter indicates that the total count has reached a certain limit in either direction.

These and other objects and advantages of the present invention are achieved by providing a multi-stage counter having a reversing circuit coupled to its input, said reversing circuit receiving two different series of pulsed type signals on respective input terminals and operating in response thereto to pass pulses to said counter on either a forward counting line or a reverse counting line. Successively received pulses from the same input series are coupled to the counter over the forward counting line and cause the pulses to be added to the count then in the counter, but when a pulse received at the reversing circuit is from the series different from the series of the preceding pulse, it is coupled to the counter over the reverse counting line and causes the counter to perform a 2's complement operation on the counter in the counter, and then the pulse is added to the complemented count. This operation is equivalent to counting backwards by subtracting the pulse from the count in the counter.

The conducting state of each stage of the counter is monitored continuously, and signals representing the states of the respective stages are coupled as inputs to an AND gate. When the counter reaches a count of $N-1$, the input signals to the AND gate cause the gate to be primed so that if the next received pulse is coupled to the counter on the forward counting line (indicating a count of N in the counter), that pulse, which also is coupled to the AND gate, will pass through the gate to give an output pulse which indicates that the total count is equal to N. The counter is constructed to operate so that it always gives a true indication when the count in the counter is $(N-1)$, regardless of from which series the greater number of pulses is received. Additionally, the indication of a zero count in the counter always is a true indication. Because of these features, the possibility of an eroneous output from the counter is eliminated.

The reversing circuit includes a flip flop circuit whose state is indicative of which one of the input series of pulses the last received input pulse is from, so may be employed to gate the output of the AND gate through either of two output gates, thus providing an indication of which series of pulses caused the counter to reach a total count of N.

The invention will be described by referring to the accompanying drawings, wherein:

FIG. 3 is a series of waveforms which will be referred to in explaining the operation of the reversing circuit of FIG. 2;

FIG. 5 is a series of waveforms which will be referred to in explaining the operation of the circuit of FIG. 4.

Figure 1:
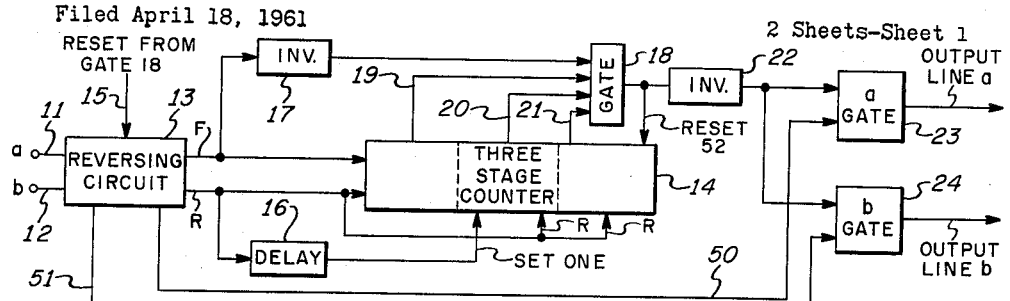
FIG. 1 is a block diagram of the circuit of the present invention.

Referring now more particularly to FIG. 1, two series of input pulses $a$ and $b$ are coupled to respective input terminals 11 and 12 of reversing circuit 13. The successive pulses of each series may represent incremental changes in a quantity, and each pulse is weighted so that a total of "X" pulses, for example, may represent a total change of "X" units of that quantity. The two series may represent changes of opposite senses. For example, if a shaft rotation is being monitored, each successive pulse of series $a$ may represent a clockwise rotation of one minute of angle, and each successive pulse of series $b$ may represent a counterclockwise rotation of one minute of angle. In the example discussed below it will be assumed that the reversible counter of FIG. 1 is designed to produce an output pulse whenever the angular position of the shaft equals a 4 minute angular displacement, either clockwise or counterclockwise, from the assumed reference position, i.e., $N=\pm 4$. It is to be understood that this assumed example is just one possible use for the circuit of this invention, and other uses and application will occur to those familiar with the art.

Reversing circuit 13, which will be described in greater detail below, is comprised of a flip flop and a number of gates and operates to direct the incoming pulses of series $a$ and $b$ to either the forward counting line F or the reverse counting line R. All pulses of series $a$ will cause the flip flop to be in one of its stable states and all pulses of series $b$ will cause the flip flop to be in its other stable state. Successively received pulses of the same series, either $a$ or $b$, are directed to the forward counting line F, and the following described pulses are directed to the reverse counting line R: the first pulse of series $b$ after counter 14 has been reset to zero, and any pulse after the first which is from a series different from the series of the immediately preceding pulse. The reversing circuit thus mechanizes the following equations:

$$F = aq + bq' \qquad (1)$$

$$R = aq' + bq \qquad (2)$$

where $q$ represents the state of the flip flop in the reversing circuit if the preceding pulse was an "$a$," and $q'$ represents the state of the flip flop if the preceding pulse was a "$b$."

A pulse directed over line F is coupled to the first-stage of counter 14 and causes a count of one to be added to the count in the counter. A pulse directed over line R to the complement input of counter 14 causes each stage of the counter to invert its conduction state, and a delayed version of that pulse, delayed by delay circuit 16, is coupled to the "set one" input of the second stage of the counter to add a count of two to the inverted count in the counter. This is really performing a 2's complement operation on the count in the counter and adding a count of one; this operation amounts, in effect, to reversing the direction of the counting by subtracting the pulse from the true count in the counter. Operationally, the counter always is counting in the forward direction.

A pulse passed on forward counting line F also is coupled through inverter 17 to one input terminal of sampling gate 18. The other input lines 19, 20 and 21 to sampling gate 18 are taken from one side of the respective stages of counter 14. The side of the respective stages which is sampled is so chosen that when there is a count of $(N-1)$ in the counter the conditions of the individual stages will be such as to condition sampling gate 18 to pass the next incoming pulse received on forward counting line F.

The counter must have a capacity to accumulate a count of at least $(2N-1)$ in order that it will have the capability of complementing any number from zero up to $N-1$.

A pulse passed by gate 18 is coupled through inverter 22 to gates 23 and 24. The second input to each of the gates 23 and 24 is taken from a respective one of the two sides of the flip flop in reversing circuit 13, and because the conduction state of said flip flop is indicative of from which series, $a$ or $b$, the last pulse was received, one of the gates 23 or 24 corresponding to that series will be conditioned to pass the pulse from sampling gate 18. Thus the circuit of this invention automatically indicates from which series $a$ or $b$ the greater number of pulses has been received. In the example assumed, it would indicate whether the shaft has rotated 4 minutes of angle in a clockwise or a counterclockwise direction.

Figure 2:
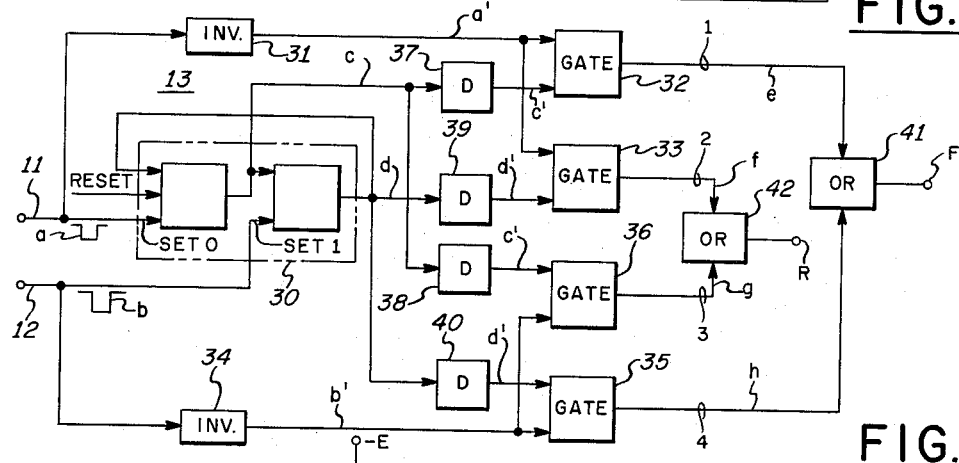
FIG. 2 is a block diagram showing in more detail the reversing circuit which is illustrated by a single block in FIG. 1.

For a more detailed description of reversing circuit 13, reference is made to FIG. 2 wherein pulses of series $a$ are coupled from input terminal 11 to the set 0 side of flip flop 30 to set the flip flop into the 0 condition, and also are coupled through inverter 31 to gates 32 and 33. Pulses of series $b$ are coupled from input terminal 12 to the set 1 side of flip flop 30 to set the flip flop into the 1 state, and also are coupled through inverter 34 to gates 35 and 36. The signal representing the conduction state of the left side of flip flop 30 is parallel coupled through delay means 37 and 38 to respective gates 32 and 36. The signal representing the conduction state of the right side of flip flop 30 is coupled through delay means 39 and 40 to the respective gates 33 and 35. The delay interval produced by each of the delay means 37–40 is slightly longer than a pulse duration. Gates 32, 33, 35 and 36 will pass a pulse only when a zero potential is present on each of the input lines. A positive pulse is defined as one that rises from a negative potential to a zero potential. The outputs of gates 32 and 35 are coupled through OR gate 41 to forward counting line F, and the outputs of gates 33 and 36 are coupled through OR gate 42 to reverse counting line R.

In the discussion of the operation of reversing circuit 13 it will be assumed that flip flop 30, inverters 31 and 34 and gates 32, 33, 35 and 36 are comprised of p-n-p type transistors connected in a known manner to perform their respective functions. A zero potential applied to the base electrode of a transistor causes the transistor to cut off, while a negative potential applied to the base of a transistor causes the transistor to conduct to saturation. It further will be assumed that the two series of input pulses $a$ and $b$ are comprised of negative pulses.

The detailed operation of the reversing circuit 13 illustrated in FIG. 2 will be explained by referring to the waveforms illustrated in FIG. 3, wherein the sequence of the received input pulses of the two series are as follows: two successive pulses from series $a$, two successive pulses from series $b$, and four successive pulses from series $a$. It is assumed that flip flop 30 initially is in the 0 state wherein the left side is conducting and its output potential, FIG. 3c, is at zero volts, and the right side of the flip flop 30 is cut off and its output signal, FIG. 3d, is at a negative potential. The first received pulse of series $a$, FIG. 3a, is coupled from input terminal 11 to the set 0 side of flip flop 30, but because flip flop 30 already is in that condition the input pulse will have no effect on the conducting state of the flip flop. The first input pulse also is coupled to inverter 31 and appears as a positive pulse, FIG. 3a', at the first input terminal of gate 32. Waveform 3c', at zero potential, is present at the other input terminal of gate 32. The first positive pulse of series $a$ therefore is passed by gate 32 and appears at the output terminal 1 of said gate, FIG. 3e. The first positive pulse of waveform 3a' also is coupled to the first input terminal of gate 33, but because waveform 3d', which is coupled to the second input terminal, is at a negative potential, said gate will be closed and it will not pass the first pulse of waveform 3a'. There is no input signal at this time on input terminal 12 so that waveform 3b' is at a negative potential and will keep gates 35 and 36 closed.

The second input pulse of series $a$ is coupled to the set 0 side of flip flop 30, and because the reversing circuit 13 is in the same condition as it was during the reception of the first pulse of series $a$, the circuit will operate in the same manner as just described so that the second received input pulse of series $a$ also is passed through gate 32 to the output terminal 1 of said gate, see FIG. 3e.

The third received pulse is from series $b$, FIG. 3b, and is coupled from input terminal 12 to the set 1 side of flip flop 30 and causes the right side thereof to conduct so that its output signal, FIG. 3d, raises to zero volts. Correspondingly, the left side of flip flop 30 is cut off and its output signal, FIG. 3c, drops to a negative potential. The third received pulse also is coupled from input terminal 12 through inverter 34 and appears as a positive pulse, FIG. 3b', at the second input terminals of gates 35 and 36. Because of delay means 40 and 38 coupled to gates 35 and 36, the respective signals coupled to the first input terminals of said gates 35 and 36 still are at the same potential as before the third input pulse was received, FIGS. 3d' and 3c'. As a result, waveform 3d' is at a negative potential which prevents gate 35 from passing the first positive pulse of waveform 3b'. Waveform 3c' which is coupled to the first input terminal of gate 36, however, is at zero potential during the occurrence of the first positive pulse of waveform 3b' so that said positive pulse will be passed by gate 36 and will appear at output terminal 3 of said gate, FIG. 3g. Waveform 3a', which is coupled to the first input terminals of gates 32 and 33, is at a negative potential during the occurrence of the third received pulse (first pulse of series $b$) and will prevent gates 32 and 33 from operating.

With this introduction to the operation of reversing circuit 13, it is believed that the operation of the circuit in response to the remainder of the input pulses can be understood by referring to the waveforms of FIG. 3, and to the following chart which indicates the potentials and conditions at different portions of the reversing circuit in response to the respective input pulses. By comparing the columns indicating the signals on the input terminals of the different gates 32, 33, 35 and 36 with the column indicating the output line from which output pulses are obtained, it will be seen that an output pulse is obtained from a gate only when both input signals thereto are at zero potential.

| Input Series | Flip Flop State | Signals on Input Terminals of Gates | | | | | | | | Output Line |
|---|---|---|---|---|---|---|---|---|---|---|
| | | 32 (a' and c') | | 33 (a' and d') | | 35 (d' and b') | | 36 (c' and b') | | |
| a | 0 | 0 | 0 | 0 | — | — | — | 0 | — | 1 |
| a | 0 | 0 | 0 | 0 | — | — | — | 0 | — | 1 |
| b | 1 | — | 0 | — | — | 0 | 0 | 0 | 0 | 3 |
| b | 1 | — | — | — | 0 | 0 | 0 | — | 0 | 4 |
| a | 0 | 0 | — | 0 | 0 | 0 | — | — | — | 2 |
| a | 0 | 0 | 0 | 0 | — | — | — | 0 | — | 1 |
| a | 0 | 0 | 0 | 0 | — | — | — | 0 | — | 1 |
| a | 0 | 0 | 0 | 0 | — | — | — | 0 | — | 1 |

Output terminals 1 and 4 of gates 32 and 35 are coupled to OR gate 41 so that the pulses passed by said gates are combined by OR gate 41 and appear on the forward counting line F, FIG. 3F. Similarly, the respective output terminals 2 and 3 of gates 33 and 36 are combined in OR gate 42 and appear on the reverse counting line R, FIG. 3R. A comparison of waveforms 3a and 3b with waveforms 3F and 3R will show that reversing circuit 13 does in fact operate to mechanize the above Equations 1 and 2.

The respective output signals FIG. 3F and FIG. 3R on the forward and reverse counting lines appear as the input signals at the first stage of the counter 14, FIG. 1. As previously mentioned, the signals on the reverse counting line R are coupled through delay means 16 to the set 1 side of the second stage of the counter 14. This has the effect of adding a count of two to the count in the counter each time a pulse is coupled over the reverse counting line.

Figure 4:
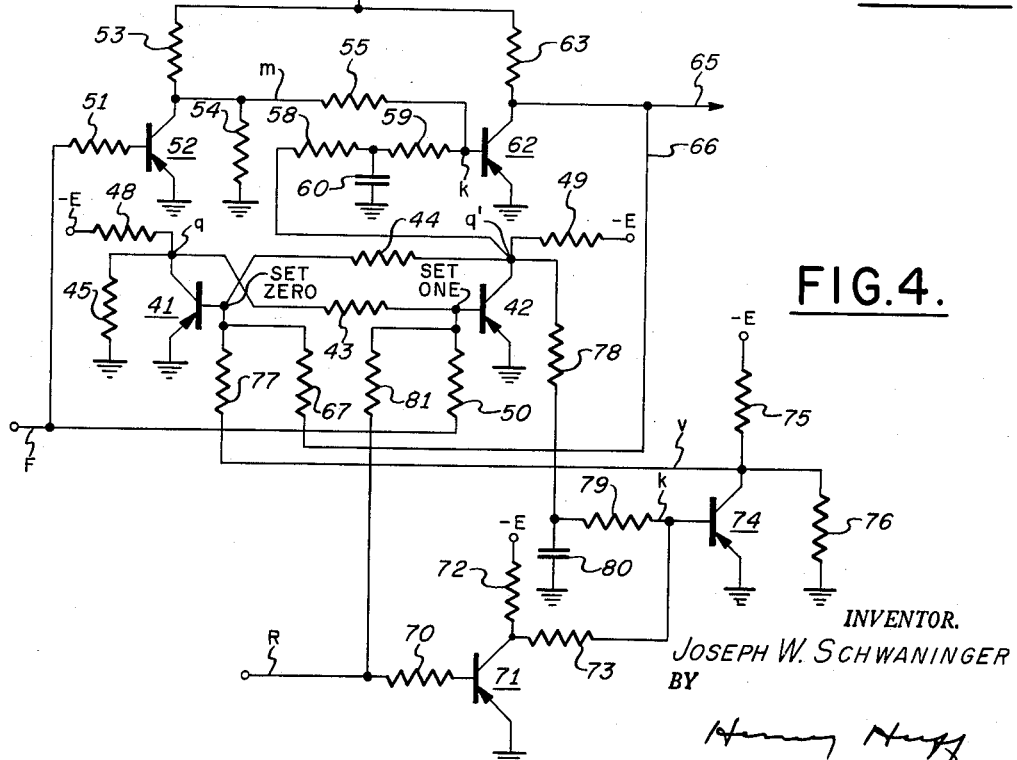
FIG. 4 is a schematic circuit diagram showing one stage of the counter illustrated in FIG. 1.

The counter 14 in FIG. 1 is shown as being comprised of three stages. All of said stages are substantially identical, and a circuit schematic diagram of the first stage is illustrated in FIG. 4. The stage is made up of a flip flop comprised of transistors 41 and 42, wherein the collector electrode of transistor 41 is directly coupled through resistor 43 to the base electrode of transistor 42, and the collector electrode of transistor 42 is directly coupled through resistor 44 to the base electrode of transistor 41. The collector electrodes of transistors 41 and 42 are respectively coupled through resistors 48 and 49 to sources of negative potential —E. The respective emitter electrodes of transistors 41 and 42 both are grounded. The collector electrode of transistor 41 is coupled through resistor 45 to ground. The forward counting line F is coupled through resistor 50 to the base electrode of transistor 42, the set 1 side of the flip flop, and also is coupled through resistor 51 to the base electrode of transistor 52 which functions as an inverter. The collector electrode of inverter 52 is coupled through resistor 53 to a source of negative potential —E, and the emitter electrode is grounded. The output signals of inverter 52 are coupled through resistor 55 to the base electrode of transistor 62, which functions as a gate to pass a positive pulse when the potential applied through resistor 59 to said base electrode is at zero volts. The collector electrode of gate transistor 62 is coupled through resistor 63 to source of negative potential —E, and the emitter electrode is grounded. The output signal of gate transistor 62 is coupled to carry terminal 65, this being the input forward counting line to the next succeeding stage. The signal on carry terminal 65 also is coupled over lead 66, through resistor 67, to the base electrode of transistor 41.

Input pulses entering the first stage of the counter on reverse counting line R are coupled through resistor 70 to the base electrode of transistor 71 which is an inverter whose collector electrode is coupled through resistor 72 to a source of negative potential —E, and whose emitter electrode is grounded. The collector electrode of inverter transistor 71 also is coupled through resistor 73 to the base electrode of transistor 74 which operates as a gate, and whose emitter electrode is grounded. Resistor 75 76 is coupled to the collector electrode of gate transistor 74 and functions as a "bleeder" resistor. Input pulses from reverse counting line R also are coupled through resistor 81 to the base electrode of transistor 42 of the flip flop. The network comprised of resistors 58, 59 and capacitor 60 coupled between the collector electrode of transistor 42 and the base electrode of transistor 62, and the similar network comprised of resistors 78, 79 and capacitor 80, coupled between the collector of transistor 42 and the base of transistor 74, both function as delaying networks to produce a delay interval slightly longer than a pulse duration.

The operation of the first stage of the counter just described will be explained by referring to the waveforms of FIG. 5, wherein waveforms 5i and 5j are the respective signals on the forward and reverse counting lines as received from the reversing circuit 13, FIG. 1. It will be assumed that the flip flop comprised of interconnected transistors 41 and 42 initially is in the zero state so that transistor 41 is conducting, FIG. $5q_1$, and transistor 42 is cut off, FIG. $5q_1'$. The first pulse received by the counter stage on the forward counting line F is coupled through resistor 50 and causes transistor 42 to conduct so that the collector potential of said transistor, FIG. $5q_1'$, goes to zero potential. This potential change is coupled through resistor 44 to the base of transistor 41 to cause transistor 41 to cut off its collector potential, FIG. $5q_1$, thereby going to a negative potential. The first received pulse on input line F also is coupled through resistor 51 to the base electrode of inverter transistor 52 and appears at the collector as the first positive pulse of waveform 5m. This positive pulse is coupled through resistor 55 to the base electrode of gate transistor 62. The signal 5k which also is coupled to said base electrode is at a negative potential, however, because the change in conduction state of transistor 42 has not yet passed through the delay network comprised of resistors 58, 59 and capacitor 60. Gate transistor 62 therefore will not pass the first positive pulse of waveform 5m.

The second input pulse to the counter state also appears on forward counting line F, FIG. 5i, and is coupled through resistor 50 to transistor 42. Because transistor 42 of the flip flop already is conducting, FIG. $5q_1'$, the conduction state of the flip flop will not change. The second received pulse on line F also is coupled through inverter transistor 52 and appears at the base eelctrode of gate transistor 62 as the second positive pulse of waveform 5m. The other input signal to the base electrode of transistor 62, FIG. 5k, now is at zero potential so that gate transistor 62 will pass the second positive pulse of waveform 5m. This pulse is coupled to carry terminal 65 as the first pulse of waveform 5n. The pulses of waveform 5n are shown slightly delayed with respect to the corresponding pulses of waveform 5i in order to account for slightly delays introduced by transistors 52 and 62 and their associated circuitry. The first negative pulse of waveform 5n also is coupled over lead 66 and through resistor 67 to the base electrode of transistor 41 to cause the conduction state of said transistor to change, FIG. $5q_1$. Because the pulses of waveform 5n are slightly delayed with respect to their corresponding input pulses of FIG. 5i, the pulses of waveform 5n will have an overriding effect to control the conducting state of the flip flop upon their application to the base electrode of transistor 41.

The third input pulse received by the counter stage is coupled over reverse counting line R, FIG. 5j, through resistor 81 to the base electrode of transistor 42 to cause said transistor to cut off, thus changing the conduction state of the flip flop, FIGS. 5q and $5q_1'$. The third input pulse also is coupled through resistor 70 to inverting transistor 71 which produces in response thereto the first positive pulse of waveform 5p. This waveform is coupled from the collector eelctrode of transistor 71, through resistor 73 to the base electrode of gate transistor 74. The other input signal to the base eelctrode of gate transistor 74, FIG. 5k, is at a negative potential at this time so that said gate transistor 74 is blocked and will not pass the first positive pulse of waveform 5p.

The fourth received pulse at the counter stage is coupled on forward counting line F to the base of transistor 42, but because said transistor already is conducting, FIG. $5q_1'$ the conducting state of the flip flop will not change. The fourth received pulse also is coupled through inverter transistor 52 and appears at the base electrode of gate transistor 62 as the third positive pulse of waveform 5m. The other signal at the base electrode of gate transistor 62, FIG. 5k, is at zero potential at this time so that gate 62 will pass the fourth received pulse which then appears at carry terminal 55 as the second negative pulse of waveform 5n. This second negative pulse of waveform 5n also is coupled over line 66 through resistor 67 to the base electrode of transistor 41 to cause said transistor to conduct, FIG. $5q_1$, and thus change the state of the flip flop.

By comparing waveforms 5j, $5q_1$ and $5q_1'$, it will be seen that each time a pulse is coupled to the counter stage on reverse counting line R, the conduction state of the flip flop is inverted.

The first stage of the counter will continue to operate in the manner described in response to the remainder of the input signals coupled thereto to produce the remainder of the waveforms illustrated in FIG. 5. The subsequent stages of the counter also will function in a similar manner, remembering that the reverse counting line is coupled to all stages in parallel so as to invert the conduction state of each stage upon a pulse being coupled over that line, and also remembering that a delayed version of each pulse on the reverse counting line R is coupled to the set 1 side of the second stage only to add a count of two to the count in the counter. To simplify the description, the chart set forth below indicates the operation of the counter for the eight input pulses of FIGS. 3a and 3b.

| Row | Input series | Line | Operation of counter | Flip Flop States | | | Total |
|---|---|---|---|---|---|---|---|
| | | | | $q_1$ | $q_2$ | $q_3$ | |
| 1 | | | | 0 | 0 | 0 | 0 |
| 2 | a | F | +1 | 1 | 0 | 0 | +1 |
| 3 | a | F | +1 | 0 | 1 | 0 | +2 |
| 4 | b | R | C | 1 | 0 | 1 | |
| | | | +2 | 1 | 1 | 1 | +1 |
| 5 | b | F | +1 | 0 | 0 | 0 | 0 |
| 6 | a | R | C | 1 | 1 | 1 | |
| | | | +2 | 1 | 0 | 0 | +1 |
| 7 | a | F | +1 | 0 | 1 | 0 | +2 |
| 8 | a | F | +1 | 1 | 1 | 0 | +3 |
| | | | Reset to— | | | | |
| 9 | a | F | +1 | 0 | 0 | 0 | +4 |

Referring to row 4 of the chart, which indicates the states of the flip flops after the first complementing operation, it will be seen that the states of the flip flops indicate the 2's complement of +1, i.e. 111, rather than the true indication 100. As seen in row 6, however, the true indication of +1, 100, is present after the second complementing operation. By referring to the Total column of the chart, it will be seen that in row 6 the absolute value of the count is increasing, while in row 4 it is decreasing. The counter of this invention thus operates to always present the true value of the count in the counter when the absolute value of the count is increasing. This assures that the counter will be in the same condition when it has a count of $\pm(N-1)$, this being the condition of the counter which primes sampling gate 18 of FIG. 1. This results from the fact that the values $\pm(N-1)$ can only be obtained when the counter is operating to increase the absolute value of the count in the counter.

When a count of $\pm(N-1)$ has been accumulated in counter 14 of FIG. 1, a count of 3 (110) in the example assumed, gate 18 is primed so that if the next succeeding pulse comes in on the forward counting line F it will pass through inverter 17 and will be passed by gate 18. To accomplish this, input leads 19, 20 and 21 are respectively coupled to the set 1, set 1 and set 0 outputs of the three counter stages.

Because the conducting state of the flip flop circuit 30 in reversing circuit of FIG. 2 always is in a state to indicate the series from which the last pulse is received, see FIGS. 3a–3d, the signals from the two sides of the flip flop 30 are coupled over leads 50 and 51 to control gates 23 and 24, FIG. 1, to direct the pulse passed by gate 18 to the respective output line which will indicate its series of origin.

When a pulse is passed by sampling gate 18, a version of this pulse is coupled over lead 52 to the counter to cause all stages of the counter to reset to the set 0 condition, and a similar pulse is coupled over lead 15 to reversing circuit 13 to set it in the set 0 condition.

It is believed clear from the above description that the counter of this invention operates to add a count of one to the count in the counter each time it receives a pulse which is from the same series of input pulses as the immediately preceding pulse, and each time it receives a pulse from the series which is different from that of the immediately preceding pulse, it operates to reverse the conduction state of each stage of the counter and then adds a count of 2 to the inverted count in the counter. This latter operation amounts to performing a 2's complement operation on the count and then adding a count of one. Operationally, the counter always counts in the forward direction, and always gives a true indication of the count registered in the counter when the absolute magnitude of the count is increasing. The counter further includes a sampling gate coupled to receive pulses which will increase the magnitude of the count, and coupled to each counter stage in a manner to prime said gate when a count of $(N-1)$ pulses is registered therein. If the next received pulse is one which would increase the absolute magnitude of the count in the counter, it will be passed by said gate and will be directed through one of two output gates, depending upon which series of pulses that Nth pulse is from. In this manner, the counter of this invention provides an indication when the received pulses of one series of pulses exceed by a number N the received pulses of another series, and also provides an indication of the series from which the greater number of pulses is received.

While the waveforms of FIGS. 3 and 5 illustrate the received pulses as being regularly occurring pulses, the counter of this invention will also function with irregularly occurring pulses.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Counting means for determining when the total number of received pulses in one series of pulses exceeds the total number of received pulses in another series by a given number, comprising a reversing circuit having two input terminals each adapted to receive a respective one of said series of pulses, said reversing circuit operating to couple to a reverse counting line any pulse which is from the series of pulses different from that of the immediately preceding pulse and to couple to a forward counting line any received pulse which is from the same series as the immediately preceding pulse, a multi-stage digital counter having said forward and reverse counting lines as input terminals and having a number of stages which is one greater than the number required to accumulate a count equal to said given number, said counter operating in response to pulses received on said forward counting line to perform a forward counting operation by increasing by one the count registered in said counter and operating in response to a pulse received on said reverse counting line to perform a 2's complement operation on the count in said counter and to increase the complemented count by one, means for monitoring the registering state of each stage of said counter to obtain a predetermined combination of output signals from the respective stages of said counter when the count registered therein is one less than said given number, a sampling gate coupled to said forward counting line and to said monitoring means and controllable by said monitored output signals to pass a pulse from said forward counting line only after the immediately preceding received pulse produced a count in said counter equal to one less than said given number.

2. The combination claimed in claim 1 wherein said reversing circuit includes a flip flop circuit coupled to receive said two series of pulses and operating to be in one stable state after receipt of a pulse from one of said series and in its other stable state after receipt of a pulse from the other one of said series, said combination further including first and second output gates parallel coupled to said sampling gate to receive pulses passed thereby, a control terminal on each of said output gates, means coupling said flip flop to the respective control terminals of said output gates to alternately open one of said gates when said flip flop is in said one stable state and to open the other of said gates when said flip flop is in its other stable state, and first and second output terminals respectively coupled to said two output gates, whereby an output pulse from said sampling gate is coupled to a respective one of said output terminals when the received pulses of one of said series exceeds by said given number the number of received pulses of the other of said series.

3. Counting means for determining when the total number of received pulses from one series of pulses exceeds by a given number the total number of pulses received in another series, comprising a reversing circuit having two input terminals each adapted to receive a respective one of said series of pulses, said reversing circuit being comprised of a flip flop circuit and a plurality of gating circuits and operating to couple to a reverse counting line any pulse which is from the series of pulses different from that of the immediately preceding pulse and to couple to a forward counting line any pulse which is from the same series as the immediately preceding pulse, a multi-stage digital counter having said forward and reverse counting lines as input terminals and having a number of stages which is one greater than the number required to accumulate a count of said given number, each stage of said counter comprising a flip flop circuit having first and second stable states, said forward counting line being coupled to the first stage of said counter and the reverse counting line being parallel coupled to each stage of said counter to reverse the state of each of said stages upon the coupling of a pulse thereto on said reverse line, a delay means providing a delay greater than a pulse duration coupled between said reverse counting line and the second stage of said counter to change the conduction state of said second state upon the application of a delayed pulse and to thereby add a count of two to the count registered in said counter, a sampling gate coupled to said forward counting line and to each stage of said counter in a manner to be primed when the count registered in said counter is equal to one less than said given number, and first and second output gates each coupled to said sampling gate and to the flip flop circuit of said reversing circuit in a manner to be alternately primed when said last-named flip flop circuit is in its alternate stable states, whereby the pulses passed by said sampling gate will be passed through a respective one of said output gates depending upon the series from which said pulse originated.

4. Counting means for determining when the total number of received pulses in one series of pulses exceed the total number of received pulses in another series of pulses by a given number, comprising first and second input terminals respectively coupled to receive said two series of pulses, a reversing circuit coupled to said input terminals and operating to couple pulses successively received from the same series to a forward counting line and to couple to a reverse counting line any pulse which is from the series of pulses different from that of the immediately preceding pulse, a multi-stage digital counter having said forward and reverse counting lines as input terminals and having a capacity to accumulate a count of at least one less than twice said given number, said counter operating in response to pulses received on said forward counting line to perform a forward counting operation by increasing by one the count registered in said counter and operating in response to a pulse receiver on said reverse counting line to invert the state of each stage of said counter and then perform a forward counting operation to add a count of two to the count then registered in the counter, a sampling gate coupled to said forward counting line and having a plurality of control terminals each coupled to a respective stage of said multi-stage counter, said control terminals being so energized when said counter registers a count of one less than said given number so as to condition said sampling gate to pass the next occurring pulse of said two series provided that said next occurring pulse is coupled to said gate on said forward counting line.

References Cited in the file of this patent

UNITED STATES PATENTS

| | | |
|---|---|---|
| 2,823,856 | Booth et al. | Feb. 18, 1958 |
| 2,880,934 | Bensky et al. | Apr. 7, 1959 |
| 3,017,093 | Rowley | Jan. 6, 1962 |